(12) United States Patent
Heydon et al.

(10) Patent No.: US 8,676,703 B2
(45) Date of Patent: Mar. 18, 2014

(54) INSURANCE POLICY REVISIONING METHOD AND APPARATUS

(75) Inventors: Clark Allan Heydon, San Francisco, CA (US); Kenneth William Branson, Los Altos, CA (US)

(73) Assignee: Guidewire Software, Inc., Foster City, CA (US)

( * ) Notice: Subject to any disclaimer, the term of this patent is extended or adjusted under 35 U.S.C. 154(b) by 1427 days.

(21) Appl. No.: 11/412,670

(22) Filed: Apr. 27, 2006

(65) Prior Publication Data

US 2007/0255601 A1 Nov. 1, 2007

(51) Int. Cl.
*G06Q 40/00* (2012.01)

(52) U.S. Cl.
USPC .................................. 705/40; 705/3

(58) Field of Classification Search
USPC ............................. 705/3, 4, 35–45
See application file for complete search history.

(56) References Cited

U.S. PATENT DOCUMENTS

| | | | |
|---|---|---|---|
| 4,567,359 A | 1/1986 | Lockwood | |
| 4,642,768 A | 2/1987 | Roberts | |
| 4,718,009 A | 1/1988 | Cuervo | |
| 4,750,121 A | 6/1988 | Halley et al. | |
| 4,766,539 A | 8/1988 | Fox | |
| 4,831,526 A * | 5/1989 | Luchs et al. | 705/4 |
| 4,837,693 A | 6/1989 | Schotz | |
| 4,839,804 A | 6/1989 | Roberts et al. | |
| 4,876,648 A | 10/1989 | Lloyd | |
| 4,969,094 A | 11/1990 | Halley et al. | |
| 5,025,138 A | 6/1991 | Cuervo | |
| 5,136,502 A | 8/1992 | Van Remortel et al. | |
| 5,191,522 A | 3/1993 | Bosco et al. | |
| 5,235,507 A | 8/1993 | Sackler et al. | |
| 5,241,466 A | 8/1993 | Perry et al. | |
| 5,325,291 A | 6/1994 | Garrett et al. | |
| 5,446,653 A * | 8/1995 | Miller et al. | 705/4 |

(Continued)

FOREIGN PATENT DOCUMENTS

| | | |
|---|---|---|
| EP | 0278132 | 8/1988 |
| EP | 0297780 | 1/1989 |

(Continued)

OTHER PUBLICATIONS

Amendment A for U.S. Appl. No. 11/086,889, Feb. 12, 2010.

(Continued)

*Primary Examiner* — Robert Niquette
(74) *Attorney, Agent, or Firm* — Van Pelt, Yi & James LLP

(57) ABSTRACT

An insurance policy is stored (101) as a plurality of discrete temporally-sequential policy data revisions. A legally binding revision for a first given date is then determined (102) by identifying all policy data revisions effective on the first given date and choosing a most temporally recent policy data revision temporally prior to a second given date. When a new policy data revision is (103) temporally subsequent as compared to a first policy data revision and also comprises a legally effective date range preceding at least in part an effective date range of the first policy data revision, legally non-overlapping policy data revisions are created (104) for each legally overlapping effective date range as exists between the new policy data revision and all temporally preceding revisions. Each newly-created legally non-overlapping policy data revision comprises changes introduced by the new policy data revision and at least one temporally preceding policy data revision.

21 Claims, 10 Drawing Sheets

(56) References Cited

U.S. PATENT DOCUMENTS

| | | |
|---|---|---|
| 5,537,315 A | 7/1996 | Mitcham |
| 5,557,515 A | 9/1996 | Abbruzzese et al. |
| 5,586,313 A | 12/1996 | Schnittker et al. |
| 5,590,037 A | 12/1996 | Ryan et al. |
| 5,655,085 A | 8/1997 | Ryan et al. |
| 5,673,402 A | 9/1997 | Ryan et al. |
| 5,689,649 A | 11/1997 | Altman et al. |
| 5,704,045 A | 12/1997 | King et al. |
| 5,737,726 A | 4/1998 | Cameron et al. |
| 5,752,236 A | 5/1998 | Sexton et al. |
| 5,761,645 A | 6/1998 | Hawkins |
| 5,806,042 A | 9/1998 | Kelly et al. |
| 5,809,478 A | 9/1998 | Greco et al. |
| 5,819,230 A | 10/1998 | Christie et al. |
| 5,839,118 A | 11/1998 | Ryan et al. |
| 5,845,256 A | 12/1998 | Pescitelli et al. |
| 5,855,005 A | 12/1998 | Schuler et al. |
| 5,873,066 A | 2/1999 | Underwood et al. |
| 5,884,274 A | 3/1999 | Walker et al. |
| 5,893,072 A | 4/1999 | Zizzamia |
| 5,897,619 A | 4/1999 | Hargrove, Jr. et al. |
| 5,903,873 A | 5/1999 | Peterson et al. |
| 5,907,828 A | 5/1999 | Meyer et al. |
| 5,913,198 A | 6/1999 | Banks |
| 5,926,792 A | 7/1999 | Koppes et al. |
| 5,926,800 A | 7/1999 | Baronowski et al. |
| 5,930,759 A | 7/1999 | Moore et al. |
| 5,950,169 A | 9/1999 | Borghesi et al. |
| 5,956,691 A | 9/1999 | Powers |
| 5,966,693 A | 10/1999 | Burgess |
| 5,970,464 A | 10/1999 | Apte et al. |
| 5,974,390 A | 10/1999 | Ross |
| 5,991,733 A | 11/1999 | Aleia et al. |
| 5,991,744 A | 11/1999 | DiCresce |
| 5,999,917 A | 12/1999 | Facciani et al. |
| 6,014,632 A | 1/2000 | Gamble et al. |
| 6,026,364 A | 2/2000 | Whitworth |
| 6,041,304 A | 3/2000 | Meyer et al. |
| 6,044,352 A | 3/2000 | Deavers |
| 6,049,772 A | 4/2000 | Payne et al. |
| 6,073,242 A | 6/2000 | Hardy et al. |
| 6,098,070 A | 8/2000 | Maxwell |
| 6,105,000 A | 8/2000 | Hickman et al. |
| 6,119,093 A | 9/2000 | Walker et al. |
| 6,128,598 A | 10/2000 | Walker et al. |
| 6,145,056 A | 11/2000 | Heydon et al. |
| 6,161,096 A | 12/2000 | Bell |
| 6,163,770 A | 12/2000 | Gamble et al. |
| 6,182,048 B1 | 1/2001 | Osborn et al. |
| 6,205,434 B1 | 3/2001 | Ryan et al. |
| 6,263,320 B1 | 7/2001 | Danilunas et al. |
| 6,263,364 B1 | 7/2001 | Najork et al. |
| 6,269,369 B1 | 7/2001 | Robertson |
| 6,301,614 B1 | 10/2001 | Najork et al. |
| 6,304,859 B1 | 10/2001 | Ryan et al. |
| 6,321,265 B1 | 11/2001 | Najork et al. |
| 6,330,541 B1 | 12/2001 | Meyer et al. |
| 6,332,125 B1 | 12/2001 | Callen et al. |
| 6,336,096 B1 | 1/2002 | Jemberg |
| 6,338,040 B1 | 1/2002 | Buman et al. |
| 6,343,272 B1 | 1/2002 | Payne et al. |
| 6,347,302 B1 | 2/2002 | Joao |
| 6,351,755 B1 | 2/2002 | Najork et al. |
| 6,377,984 B1 | 4/2002 | Najork et al. |
| 6,393,405 B1 | 5/2002 | Vicente |
| 6,418,415 B1 | 7/2002 | Walker et al. |
| 6,430,542 B1 | 8/2002 | Moran |
| 6,473,737 B2 | 10/2002 | Burke |
| 6,484,144 B2 | 11/2002 | Martin et al. |
| 6,584,446 B1 | 6/2003 | Buchanan et al. |
| 6,594,694 B1 | 7/2003 | Najork et al. |
| 6,604,080 B1 | 8/2003 | Kern |
| 6,606,740 B1 | 8/2003 | Lynn et al. |
| 6,609,111 B1 | 8/2003 | Bell |
| 6,625,582 B2 | 9/2003 | Richman et al. |
| 6,684,189 B1 | 1/2004 | Ryan et al. |
| 6,684,190 B1 | 1/2004 | Powers et al. |
| 6,687,362 B1 | 2/2004 | Lindquist et al. |
| 6,714,914 B1 | 3/2004 | Peters et al. |
| 6,725,201 B2 | 4/2004 | Joao |
| 6,760,709 B2 | 7/2004 | Graff |
| 6,850,890 B1 | 2/2005 | Roff |
| 6,869,362 B2 | 3/2005 | Walker et al. |
| 6,870,913 B2 | 3/2005 | Narasimhan et al. |
| 6,883,000 B1 | 4/2005 | Gropper |
| 6,937,990 B1 | 8/2005 | Walker et al. |
| 6,952,730 B1 | 10/2005 | Najork et al. |
| 7,013,284 B2 | 3/2006 | Guyan et al. |
| 7,027,463 B2 | 4/2006 | Mathew et al. |
| 7,072,841 B1 | 7/2006 | Pednault |
| 7,080,104 B2 | 7/2006 | Ring et al. |
| 7,113,913 B1 | 9/2006 | Davis et al. |
| 7,167,855 B1 | 1/2007 | Koenig |
| 7,187,932 B1 | 3/2007 | Barchi |
| 7,236,952 B1 | 6/2007 | D'Zmura |
| 7,249,037 B2 | 7/2007 | Koppes et al. |
| 7,265,858 B2 | 9/2007 | Park et al. |
| 7,277,861 B1 * | 10/2007 | Benson et al. .................... 705/4 |
| 7,788,296 B2 | 8/2010 | Dalbora et al. |
| 2001/0011223 A1 | 8/2001 | Burke |
| 2002/0004725 A1 | 1/2002 | Martin et al. |
| 2002/0013751 A1 | 1/2002 | Facciani et al. |
| 2002/0016857 A1 | 2/2002 | Harari |
| 2002/0026334 A1 | 2/2002 | Igoe |
| 2002/0032586 A1 | 3/2002 | Joao |
| 2002/0035488 A1 | 3/2002 | Aquila et al. |
| 2002/0049610 A1 | 4/2002 | Gropper |
| 2002/0049828 A1 | 4/2002 | Pekarek-Kostka |
| 2002/0052764 A1 | 5/2002 | Banks |
| 2002/0057915 A1 | 5/2002 | Mann |
| 2002/0077869 A1 | 6/2002 | Doyle et al. |
| 2002/0091553 A1 | 7/2002 | Callen et al. |
| 2002/0161681 A1 | 10/2002 | Richman et al. |
| 2002/0170966 A1 | 11/2002 | Hannigan et al. |
| 2003/0018498 A1 | 1/2003 | Banks |
| 2003/0055767 A1 | 3/2003 | Tamura et al. |
| 2003/0065540 A1 | 4/2003 | Callen et al. |
| 2003/0069874 A1 | 4/2003 | Hertzog et al. |
| 2003/0115126 A1 | 6/2003 | Pitroda |
| 2003/0154109 A1 | 8/2003 | Martin et al. |
| 2003/0158860 A1 | 8/2003 | Caughey |
| 2003/0182310 A1 | 9/2003 | Charnock et al. |
| 2003/0208490 A1 | 11/2003 | Larrea et al. |
| 2003/0220966 A1 | 11/2003 | Hepper et al. |
| 2004/0059786 A1 | 3/2004 | Caughey |
| 2004/0064404 A1 | 4/2004 | Cohen et al. |
| 2004/0093222 A1 | 5/2004 | Sipe et al. |
| 2004/0119760 A1 | 6/2004 | Grossman et al. |
| 2004/0133561 A1 | 7/2004 | Burke |
| 2004/0148201 A1 * | 7/2004 | Smith et al. ................. 705/4 |
| 2004/0162833 A1 | 8/2004 | Jones et al. |
| 2004/0172304 A1 | 9/2004 | Joao |
| 2004/0186896 A1 | 9/2004 | Daniell et al. |
| 2004/0193456 A1 * | 9/2004 | Kellington ................. 705/4 |
| 2004/0215493 A1 | 10/2004 | Koppes et al. |
| 2004/0225535 A1 | 11/2004 | Bond et al. |
| 2004/0229671 A1 | 11/2004 | Stronach et al. |
| 2004/0236792 A1 | 11/2004 | Celik |
| 2004/0267595 A1 | 12/2004 | Woodings et al. |
| 2005/0060638 A1 | 3/2005 | Mathew et al. |
| 2005/0075947 A1 | 4/2005 | Bell et al. |
| 2005/0120084 A1 | 6/2005 | Hu et al. |
| 2005/0149376 A1 | 7/2005 | Guyan et al. |
| 2005/0193063 A1 | 9/2005 | Cannata et al. |
| 2005/0250552 A1 | 11/2005 | Eagle et al. |
| 2006/0031088 A1 | 2/2006 | Risen et al. |
| 2006/0052091 A1 | 3/2006 | Onyon et al. |
| 2006/0136274 A1 | 6/2006 | Olivier et al. |
| 2006/0155750 A1 | 7/2006 | Fowler et al. |
| 2006/0190546 A1 | 8/2006 | Daniell |
| 2006/0195422 A1 | 8/2006 | Cadiz et al. |
| 2006/0212452 A1 | 9/2006 | Cornacchia, III |
| 2006/0218017 A1 | 9/2006 | Ren et al. |
| 2006/0242210 A1 | 10/2006 | Ring et al. |

(56) References Cited

U.S. PATENT DOCUMENTS

| | | |
|---|---|---|
| 2006/0265255 A1 | 11/2006 | Williams |
| 2007/0005463 A1 | 1/2007 | Davis et al. |
| 2007/0070940 A1 | 3/2007 | Vander Veen et al. |
| 2007/0106698 A1 | 5/2007 | Elliott et al. |
| 2007/0118533 A1 | 5/2007 | Ramer et al. |
| 2007/0150542 A1 | 6/2007 | Sommerer |
| 2007/0156465 A1 | 7/2007 | Walker et al. |
| 2007/0162454 A1 | 7/2007 | D'Albora et al. |
| 2007/0265889 A1 | 11/2007 | Koppes et al. |
| 2007/0276705 A1 | 11/2007 | Walker et al. |
| 2008/0275717 A1 | 11/2008 | Willard et al. |
| 2008/0306771 A1* | 12/2008 | Zhou et al. .................. 705/3 |
| 2009/0210258 A1 | 8/2009 | Cardot et al. |
| 2011/0071858 A1 | 3/2011 | Keefer |
| 2011/0071859 A1 | 3/2011 | Keefer |

FOREIGN PATENT DOCUMENTS

| | | |
|---|---|---|
| EP | 0332770 | 9/1989 |
| EP | 0472786 | 3/1992 |
| EP | 0895173 | 2/1999 |
| EP | 1338966 | 8/2003 |
| WO | 8401448 | 4/1984 |
| WO | 9300643 | 1/1993 |
| WO | 9308546 | 4/1993 |
| WO | 9322735 | 11/1993 |
| WO | 9410637 | 5/1994 |
| WO | 9503569 | 2/1995 |
| WO | 9619774 | 6/1996 |
| WO | 9621903 | 7/1996 |
| WO | 9624103 | 8/1996 |
| WO | 9741524 | 11/1997 |
| WO | 9812616 | 3/1998 |
| WO | 9838563 | 9/1998 |
| WO | 9821680 | 1/1999 |
| WO | 9901810 | 1/1999 |
| WO | 9921116 | 4/1999 |
| WO | 9922330 | 5/1999 |
| WO | 9923589 | 5/1999 |
| WO | 9924891 | 5/1999 |
| WO | 9927482 | 6/1999 |
| WO | 9944111 | 9/1999 |
| WO | 9960537 | 11/1999 |
| WO | 0013101 | 3/2000 |
| WO | 0017800 | 3/2000 |
| WO | 0023927 | 4/2000 |
| WO | 0052616 | 9/2000 |
| WO | 0052866 | 9/2000 |
| WO | 0057310 | 9/2000 |
| WO | 0063812 | 10/2000 |
| WO | 0063813 | 10/2000 |
| WO | 0063815 | 10/2000 |
| WO | WO 2004/049114 * | 6/2004 |

OTHER PUBLICATIONS

Christopher B. Eide, "Guidewire's pending U.S. Appl. No. 11/321,671", Letter from Morrison Foerster, Apr. 2, 2010.

European Search Report from a counterpart European patent application No. 06 02 7066 dated Mar. 22, 2007.

Goodcontacts Research Ltd., "GoodContacts Synchronizer Solution", 2003.

Guidwire Softwareguidewire Software, "Guidewire ClaimCenter Components", Jan. 2004.

Non-Final Office Action for U.S. Appl. No. 11/086,889, Nov. 12, 2009.

Resubmitted Amendment A for U.S. Appl. No. 11/086,889, Mar. 18, 2010.

* cited by examiner

600

701
Policy Change: Merge Rules for Out-of-sequence Changes
Apply changes to renewal period (if any)?
○ Yes  ● No 702
How should merge conflicts be resolved (when the same field is edited in both versions)?
● Out-of sequence change overwrites future version   ○ Future version value is retained

[Recalculate merge]  [Cancel]
705              703              704

700

View current changes only

View changed: 1: 1997 Toyota Corolla — 801
License Plate changed from 1GLC254 to 2QWS945 [01/07/2006] — 802
Merge conflict for License Plate: Current change to 2QWS945 over-wrote previous change to 2QWS944 [01/23/2006] — 803
Alt: Merge conflict for License Plate: Previous change to 2QWS944 retained instead of current change to 2QWS945 [01/23/2006] — 804
Coverage changed:
    Added: Towing and Labor [01/23/2006]
    Changed: Collision
        Deductible changed from 500 to 1000 [01/23/2006]
        Deductible changed from 1000 to 500 [05/07/2006]
    Removed: Collision [06/07/2006]
Vehicle added: 3: 2006 Honda CR-V [01/07/2006]
Driver changed: 1. Bill Kinman
    Good driver discount changed from False to True [05/07/2006]
    Marital status changed from Married to Single [06/07/2006]
Driver removed: 2. Janet Kinman [01/23/2006]
Driver added: 3: John Kinman [01/07/2006]
State-level coverage changed: Liability - Bodily Injury and Property Damage
    Limit changed from 50/100/50 to 25/50/25 [01/23/2006]

| Case | A | B | D₁ | D₂ | Δ_B | Δ₁ | Δ₂ | Add Diffs | Conflict Resolution | Comment |
|---|---|---|---|---|---|---|---|---|---|---|
| 0 | X | X | X | X | {} | {} | {} | {} | N/A | No changes at all |
| 1 | X | X | X | Y | {} | {} | {X→Y} | {X→Y} | USER_CHANGE | User change of D₂ from X→Y |
| 2A | | | | Y | | | {} | {} | N/A | No change; value Y merged forward from D₁ to D₂ |
| 2B | X | X | Y | Z | {} | {X→Y} | {Y→Z} | {Y→Z} | USER_CHANGE | User change of D₂ from Y→Z |
| 2C | | | Y | X | | | {Y→X} | {Y→X} | USER_CHANGE | User change of D₂ from Y→X |
| 3A | | | | Y | | | {X→Y} | {X→Y} | NO_CONFLICT | No change; value Y retained from B |
| 3B | X | Y | X | Z | {X→Y} | {} | {X→Z} | {X→Z} | USER_CHANGE | User change of D₂ from Y→Z |
| 3C | | | | X | | | {} | {} | N/A | User change of D₂ from Y→X; net effect is no diff |
| 4A | | | | Y | | | {} | {} | N/A | No change; value Y retained from B and D₁ |
| 4B | X | Y | Y | Z⁽¹⁾ | {X→Y} | {X→Y} | {Y→Z} | {Y→Z} | USER_CHANGE | User change of D₂ from Y→Z |
| 5A | | | | Y | | | {Z→Y} | {Z→Y} | RETAIN_OLD | Merge conflict resolved by retaining old value Y from B |
| 5B | X | Y | Z | Z | {X→Y} | {X→Z} | {} | {Y→Z} | MERGE_NEW | Merge conflict resolved by merging new value Z forward |
| 5C | | | | W⁽²⁾ | | | {Z→W} | {Z→W} | USER_CHANGE | Merge conflict resolution overridden by user to new value W |

INSURANCE POLICY REVISIONING METHOD AND APPARATUS

TECHNICAL FIELD

This invention relates generally to insurance products.

BACKGROUND

Insurance policies are known in the art and comprise complex agreements that specify items to be afforded coverage with respect to particular perils. An insurance policy almost invariably extends coverage for a pre-determined period, during which claims can be made for covered losses. As a result, insurance policies rely heavily on accurate treatment of time periods. The policy period is usually one year, and policies are generally renewed on an annual basis, with a new policy period starting at the end of the previous period. In some cases, changes to a policy coincide with the annual renewal, but in many cases changes occur mid-term. As a result, the effective date of a policy change may not coincide with the end of the policy period.

The effective date of a policy change is the date on which the change becomes legally effective and can comprise a present, retroactive, or future date. The change date of a policy change is the date on which the change was actually made. Changes to a policy, whether at renewal or mid-term, trigger a series of follow-on computations, the most important of which is often a recalculation of the total cost of the policy to reflect the changes and the amount of time remaining in the policy period. For purposes of evaluating a premium, insurers need to know what coverages were, are, or will be in effect for what durations. In addition, for purposes of evaluating a claim, insurers need to be able to determine what coverages were in effect as of the date of the claim.

The ability to make changes with effective dates forward and backward in time can lead to many difficulties that have not been satisfactorily addressed by any existing implementations. A significant problem lies in dealing with out-of-sequence endorsements (OOSE), wherein an endorsement (which comprises a change to an existing policy) has a change date that is temporally subsequent to an existing revision but has an effective date that legally precedes that existing revision. When an OOSE is included in a policy, any existing revisions that are legally subsequent to the OOSE must often be re-evaluated and/or re-priced based on the terms introduced by the OOSE.

In addition, and particularly with OOSE's, it is often not enough to record only the effective date of each change. At times the insurer will also want to analyze the policy based on the change date. An insurer needs to be able to ask not only what was effective as of the date of loss, but also what changes had been made as of that date. Such information may be particularly helpful when detecting fraud or in creating a trail for audit purposes. Therefore, there are two clearly distinct dimensions of time that should be represented with each change and used correctly by the policy management application.

Existing systems do not adequately address the concerns presented by OOSE's. In many cases, to apply an OOSE, all existing changes with later effective dates must be reversed, the OOSE applied, and the subsequent changes reapplied. This approach effectively forces the user to reorder the sequence of changes and pretend that they actually occurred in strict chronological order. In many cases, all information about the actual time of the change is lost or greatly obscured, preventing the ability to detect fraud and track audits, as discussed above. Instead, only the effective date of the change is preserved and the system can only determine the current legally binding terms for an effective date, without being able to reconstruct the legally binding terms for any effective date based on an earlier date. As a result, current approaches to handling insurance policy revisions do not satisfactorily address the concerns presented by OOSE's and the tracking of change dates and effective dates.

BRIEF DESCRIPTION OF THE DRAWINGS

The above needs are at least partially met through provision of the insurance policy revisioning method and apparatus described in the following detailed description, particularly when studied in conjunction with the drawings, wherein:

FIG. 8 comprises an illustrative screen shot as configured in accordance with various embodiments of the invention;

FIG. 11 comprises an illustrative schematic as configured in accordance with various embodiments of the invention;

Figure 1:
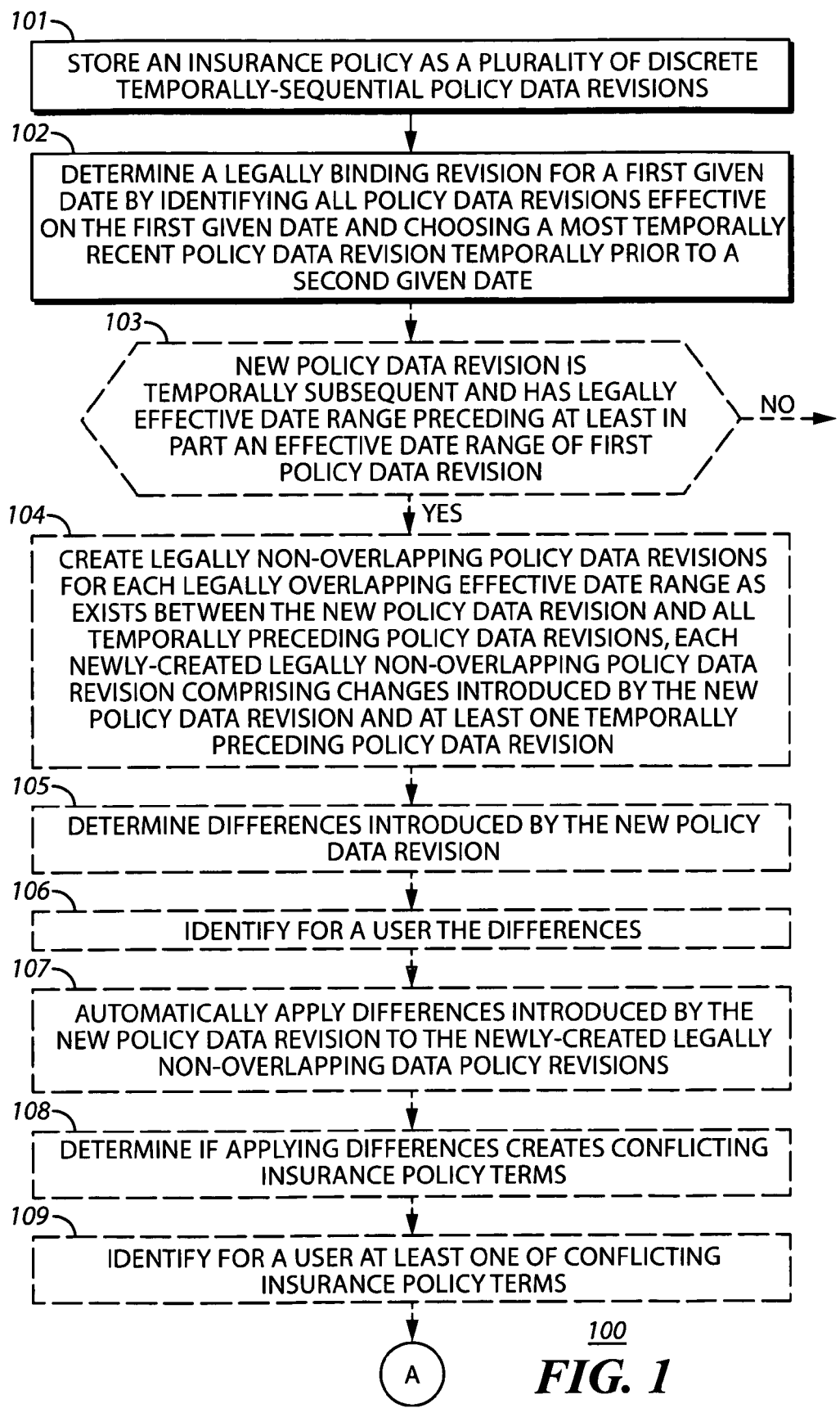
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an insurance policy is stored as a plurality of discrete temporally-sequential policy data revisions, wherein each revision incorporates information from temporally prior revisions covering an effective date range of the revision. A legally binding revision for a first given date is then determined by identifying all policy data revisions effective on the first given date and choosing a most temporally recent policy data revision temporally prior to a second given date. Further, each policy data revision may have a corresponding change date and a corresponding legally effective date stored therewith. The change dates and the legally effective dates may then be used to facilitate determination of a present liability. In addition, the policy data revisions may be queried in terms of the change date and the legally effective date to determine a status of the insurance policy as of the queried-for dates.

When a new policy data revision is temporally subsequent as compared to a first policy data revision and also comprises a legally effective date range preceding at least in part an effective date range of the first policy data revision, legally non-overlapping policy data revisions are created for each legally overlapping effective date range as exists between the new policy data revision and all temporally preceding policy data revisions. Each newly-created legally non-overlapping policy data revision comprises changes introduced by the new policy data revision and at least one temporally preceding policy data revision. The new policy data revision may comprise a bound revision or may comprise an unbound draft revision.

Further, differences introduced by the new policy data revision can then be determined, with the differences being optionally identified for a user. The differences introduced by the new policy data revision can then be applied to the newly-created legally non-overlapping policy data revisions to create merged legally non-overlapping policy data revisions. In addition, if the application of those differences creates conflicting insurance policy terms, the user may be provided with an opportunity to resolve the conflicting insurance policy terms, or the conflicting insurance policy terms may be automatically resolved.

So configured, an insurance policy period may be divided up into time intervals with multiple policy revisions corresponding to each time interval. As a result, insurance providers may readily track insurance policy revisions and accurately process claims based on the effective dates and change dates of the revisions. Further, revisions occurring out of sequence will not result in the loss of information about the actual time of the change, and will instead preserve both the effective date and change date.

These and other benefits may become clearer upon making a thorough review and study of the following detailed description. Referring now to the drawings, and in particular to FIG. 1, an illustrative enabling method 100 will store 101 an insurance policy as a plurality of discrete temporally-sequential policy data revisions, wherein each revision incorporates information from temporally prior revisions covering an effective date range of the revision. More particularly, each revision may incorporate information from a temporally prior revision having legally effective date ranges that overlap at least in part the legally effective date range of that revision.

A legally binding revision for a first given date is then determined 102 by identifying all policy data revisions effective on the first given date and choosing a most temporally recent policy data revision temporally prior to a second given date. The second given date may be the same as the first given date or the second given date may be different from the first given date.

The insurance policy may comprise supplemental policy-specific data. Further, an insurance product model may be provided, wherein the insurance product model may be substantively interpreted to thereby facilitate obtaining the supplemental policy-specific data. The interested reader can learn more regarding insurance product models by reference to Insurance Product Model-Based Apparatus and Method as filed on Feb. 7, 2006 and having application Ser. No. 11/349,456, the contents of which are fully incorporated herein by this reference.

Each policy data revision may have a corresponding change date and a corresponding legally effective date stored therewith. The legally effective date is the date on which that revision becomes effective. This effective date does not necessarily correspond to the change date, which is the date on which the revision was made in actual time. For example, it is common for changes to a policy to be made retroactively, where the effective date is earlier than the change date. As an example, a car may be purchased, with the owner adding the car to the owner's insurance policy several days after the purchase date, with coverage extending retroactively back to the purchase date. Therefore, the effective date of the addition would be the purchase date. The change dates and the legally effectives dates can then be used to facilitate determination of a present liability, such as, for example, with respect to a claim for coverage.

Figure 4:
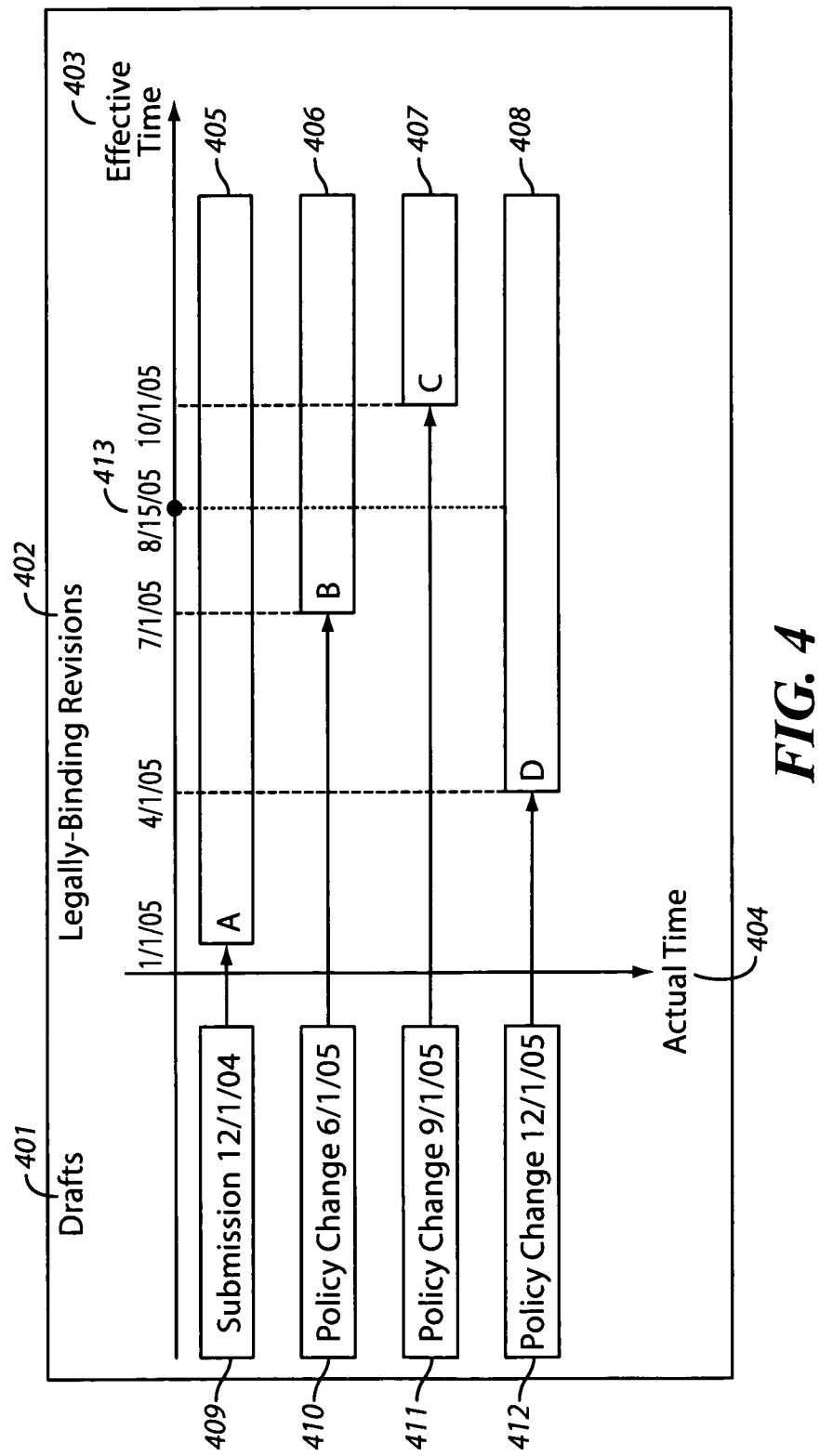

Referring momentarily to FIG. 4, an illustrative schematic of an insurance policy having discrete policy data revisions is shown. A series of draft policy revisions are listed under the Drafts heading 401, and the bound versions of those policy revisions are shown under the Legally-Binding Revisions heading 402. The draft revisions are revisions that are not effective and are therefore "unbound." Once the draft revision becomes effective and incorporated into the policy, it is now a bound policy data revision. The x-axis 403 shows time in terms of effective dates for the resulting bound policy revisions. Each revision is displayed showing the period that the revision covers at the time the revision is created (starting at the revision effective date and usually ending at the policy period expiration date). The y-axis 404 shows time in terms of the change date, which is the actual time that the actions take place in the system (i.e., drafts are shown in the order in which they are begun and bound revisions are shown in the order in which they are bound, which is usually the same order).

As shown in FIG. 4, the bars labeled as A 405, B 406, C 407 and D 408 each represent a policy data revision. As indicated, in this example A represents a submission of a newly created policy, and B, C, and D represent policy changes. For example, A may represent the submission of an auto policy 409 on Dec. 1, 2004, effective Jan. 1, 2005. In revision B, the policy change 410 increased the liability limit on Jun. 1, 2005, effective Jul. 1, 2005 and in revision C the policy change 411 lowers the default collision deductible on Sep. 1, 2005, effective Oct. 1, 2005. In revision D, the policy change 412 adds a new vehicle on Dec. 1, 2005, effective Apr. 1, 2005. It should be noted that revision D is an out-of-sequence endorsement, or OOSE, because its effective date is earlier than temporally preceding revisions B and C.

Referring again to FIG. 1, once the insurance policy is stored as a plurality of discrete temporally-sequential policy data revisions, a legally binding revision for a given date can then be determined 102 by first identifying all policy data revisions effective on that date. In FIG. 4, for example, a given date of Aug. 15, 2005 413 is located along the effective time x-axis 403, and it can be seen that the policy data revisions effective on that date are revisions A 405, B 406 and D 408. Then, the legally binding revision is determined by choosing a most temporally recent policy data revision that is temporally prior to a second given date (wherein the second given date is specified by the user). For example, if the user wanted to determine the legally binding revision effective on Aug. 15, 2005 when looking at the policy as of an actual date of Jan. 1, 2006, the revision is found in FIG. 4 by following the Aug. 15, 2005 413 line down from the x-axis and locating the revision having a change date that is temporally prior to the date of Jan. 1, 2006 on the actual time y-axis 404. Therefore, the legally binding revision for Aug. 15, 2005 when looking at the policy as of Jan. 1, 2006 is revision D 408, as revision D has a change date of Dec. 1, 2005, which is the most temporally recent policy data revision that is temporally prior to Jan. 1, 2006. It should be noted that this representation may be used to answer many other questions. For example, a user can determine the status of a policy based on a specific date by looking for the most temporally recent revision with a change date prior to that specific date (effectively drawing the line starting partway up the y-axis).

When a new policy data revision is created, the user specifies an effective date for the change. This effective date is used to look up the temporally most recent legally binding revision as of that effective date as described above. This legally binding revision is used as the basis for the new revision, that is, the draft new revision is initialized to be a copy of the most temporally recent legally binding revision. In FIG. 4, the draft revision D 408 is initialized as a copy of revision A 405 because A 405 is the most temporally recent legally binding revision. It should also be noted that the changes later introduced in revisions B 406 and C 407 are not incorporated into the revision D 408 as it is initially created, since those changes became effective after D's effective date.

Any changes made to revision D 408 apply to the rest of the policy period. However, these changes must be merged together with any changes made to the same policy with later effective dates. In FIG. 4, for example, the addition of the vehicle in revision D 408 effective Apr. 1, 2005 applies through the end of the policy period, but the subsequent changes made to B 406 and C 407 must also be incorporated into D 408 for legal and pricing purposes. To incorporate these later changes into D 408, one embodiment of the policy revisioning method automatically breaks D 408 into multiple temporally non-overlapping segments, with each of these segments representing a complete policy revision. There is one segment for each temporally preceding bound revision. In the example of FIG. 4, there will be a first segment that includes the changes made to revision A 405 (the addition of the new vehicle), a second segment that merges those changes with the changes incorporated in revision B 406 (the increased liability limit), and a third segment that merges those changes with the changes incorporated in revision C 407 (the decrease in the default collision deductible). The revision is divided into independent segments to reflect and preserve the legal differences for each segment and aids a user in determining the status of the policy at a particular point in time. For example, in the event of a claim whose time period falls in the second or third segment, the liability limit will be higher than if the claim had fallen in the first segment's time period. The process of creating the segments will be further discussed below.

Referring again to FIG. 1, when a new policy data revision is 103 temporally subsequent as compared to a first policy data revision and also comprises a legally effective date range preceding at least in part an effective date range of the first policy data revision (i.e., an out-of-sequence endorsement or OOSE), legally non-overlapping policy data revisions are created 104 for each legally overlapping effective date range as exists between the new policy data revision and all temporally preceding policy data revisions. Each newly-created legally non-overlapping policy data revision comprises changes introduced by the new policy data revision and at least one temporally preceding policy data revision.

Figure 5:
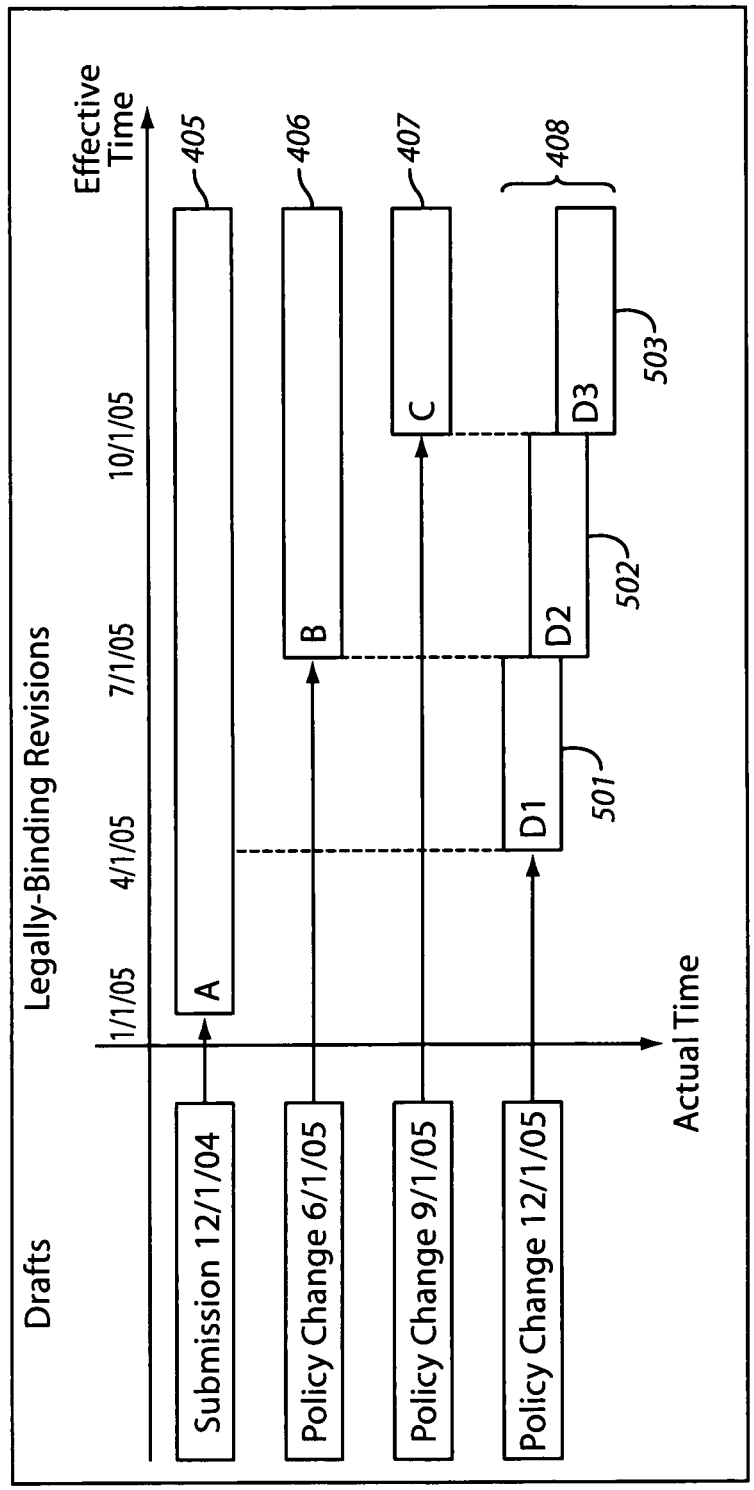
FIG. 5 comprises an illustrative schematic as configured in accordance with various embodiments of the invention.

Referring again to FIG. 4, an OOSE is represented by revision D 408. In this example, D 408 is a new revision that is temporally subsequent (i.e., along the actual time y-axis 404) to policy revisions B 406 and C 407, and also comprises a legally effective date range (i.e., along the effective time x-axis 403) preceding at least in part the effective date ranges of policy revisions B 406 and C 407. Therefore, legally non-overlapping policy data revisions are created for each legally overlapping period as exists between the new policy data revision and all temporally preceding policy data revisions. As shown in FIG. 5, revision D 408 has been divided into segments D1 501, D2 502, and D3 503 that are now legally non-overlapping policy data revisions. Revision D 408 was divided into the segments based on where D 408 legally overlaps the temporally preceding policy data revisions. Therefore, D1 501 spans from D's effective date to the initial effective date of B, D2 502 spans from the initial effective date of B to the initial effective date of C, and D3 503 spans from the initial effective date of C to the final effective date of the policy.

Figures 6, 7:
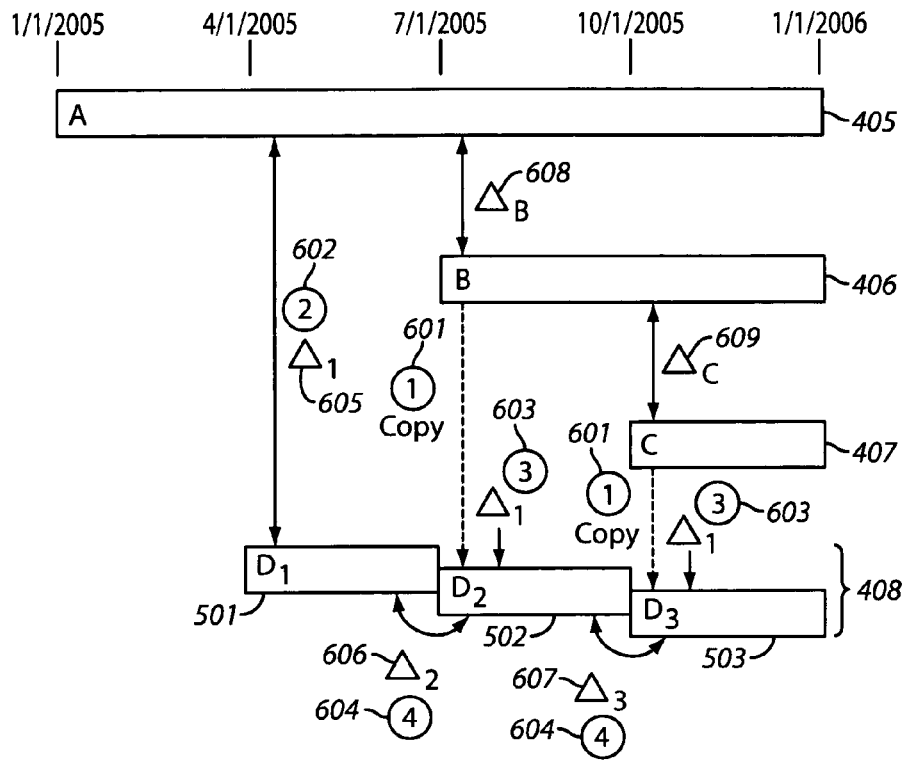
FIG. 6 comprises an illustrative schematic as configured in accordance with various embodiments of the invention.
FIG. 7 comprises an illustrative screen shot as configured in accordance with various embodiments of the invention.

This first step of creating the non-overlapping policy data revisions is shown in FIG. 6 and denoted by circled number 1 601. Initially, D1 501 represents the changes made by the new revision D 408 to revision A 405, D2 502 is created by copying revision B 406, and D3 503 is created by copying revision C 407.

Referring again to FIG. 1, once the non-overlapping policy data revisions are created, the system may then determine 105 the differences introduced by the new policy data revision. In a typical approach, the system determines the differences introduced by the new policy data revision as compared to a temporally prior revision. This second step, denoted by circled number 2 602 in FIG. 6, determines the changes made by the new OOSE revision D 408 as compared to revision A 405, with the differences of the OOSE represented as $\Delta_1$ 605. Further, and referring again to FIG. 1, at least one of the differences introduced by the new revision may also be identified 106 for a user.

A policy revision is represented by a hierarchy of policy revision elements. These elements, such as coverages, coverage terms, exposure units, and policy lines, each have a unique identifier that remains the same across revisions of the same policy. These identifiers are called revision-independent IDs, or RIIDs. When a new element (such as a coverage) is created and added to a policy, a unique RIID is selected and assigned to it.

Collecting the differences $\Delta_1$ between revision A and revision D is accomplished by using RIIDs to match up like elements between the two revisions. Three kinds of changes are identified: additions of new elements, removals of existing elements, and changes to field values of existing elements. For those elements that exist in both revisions, the invention recursively looks for field changes to those elements, as well as additions or removals of sub-entities it contains. Since not all field changes are relevant to the user (such as internal fields relevant only to the implementation), certain field differences may be excluded from the computation.

Once the differences introduced by the new policy data revision are determined, the system may automatically apply 107 the differences introduced by the new policy data revision into the newly-created legally non-overlapping policy data revisions, to create merged legally non-overlapping policy data revisions. This third step, denoted by circled number 3 603 in FIG. 6, involves applying the differences $\Delta_1$ 605 to both D2 502 and D3 503, thereby merging the OOSE differences forward to those legally subsequent revisions being superseded by revisions D2 502 and D3 503. Therefore, each segment (D1 501, D2 502, and D3 503) now represents the merging of the differences between the base revision (A 405) and the new revision (D 408), or $\Delta_1$ 605, and the effect of the overlapping revision it supersedes (B 406 as to D2 502 and C 407 as to D3 503). As a result, D1 501 revision represents the changes to revision A 405, while the D2 502 revision incorporates the new changes of revision D 408 and the effect of revision B 406. Similarly, the D3 503 revision incorporates the new changes of revision D 408 and the effect of revision C 407.

Therefore, using the examples given for the specific policy submission and changes as discussed above, $\Delta_1$ would be the addition of the new car, so D1 represents the addition of the new car. D2 represents $B+\Delta_1$, therefore the higher limit of revision B is applied to the new car. D3 represents $C+\Delta_1$, therefore the lower deductible of revision C is applied to the new car.

Referring again to FIG. 1, automatically applying the differences introduced by the new policy data revision may further comprise determining 108 if applying the differences introduced by the new policy data revision into the newly-created legally non-overlapping policy data revisions creates conflicting insurance policy terms. When merging forward the differences of the OOSE, any incompatible changes, or so-called merge conflicts may be detected. A merge conflict occurs if the same field was changed to two different values in two different revisions. In the event of a merge conflict, the conflicts must be resolved. If no merge conflicts exist, then $D2=B+\Delta_1$ and $D3=C+\Delta_1$.

Merge conflicts are detected by comparing the differences $\Delta_1$ to the changes that were made to produce the bound revision with the later effective date. For example, and referring now to FIG. 6, before applying the differences $\Delta_1$ to D2, the differences $\Delta_B$ 608 must be collected. Similarly, before applying the differences $\Delta_1$ to D3, the differences $\Delta_C$ 609 must be collected. Any merge conflicts are then detected by comparing the differences $\Delta_1$ to the differences collected ($\Delta_B$ and $\Delta_C$) by matching up changes to elements with the same RIID.

Without loss of generality, consider the case of detecting merge conflicts between the differences $\Delta_1$ and $\Delta_B$. There are three potential kinds of merge conflicts. First, an element removed in $\Delta_B$ may also have been removed in $\Delta_1$. The removal does not really represent a conflict, but represents the back-dating of an element's removal. In this case, the removal in $\Delta_B$ can be ignored, since the element is already removed in D2. Second, an element removed in one revision may have had one of its fields modified in another revision. In this case, the outright removal of the element trumps the field change. Again, this does not represent an outright conflict, but the user must be informed of both changes. Finally, the same field of the same element may have been changed to different values in the two revisions. For example, if the liability limit had a value of $100 in revision A, was changed to a value of $200 in B, but was changed to a value of $300 in D, then the change from $100 to $300 in $\Delta_1$ conflicts with the change $100 to $200 in $\Delta_B$. The conflict can be detected by noticing that the same field was changed to different values in the two revisions. Once the conflicts are detected, the conflicts may then be resolved, as further described below.

There may be situations in which two independent changes do not conflict directly at the field level, but when combined in a single policy revision, those changes together may require additional changes to the policy. For example, suppose an auto policy originally includes a car designated as "Special" and is garaged in CA. Suppose the change $\Delta_B$ modifies the car's type to "Private Passenger," and that the change $\Delta_1$ changes the car's garage location to KY. These changes are to different fields, so they do not conflict. However, KY is known as a PIP (personal injury protection) state, which requires an additional PIP coverage for all private passenger vehicles. Hence, when these two changes are combined, an additional coverage is required on the resulting policy revision. In some cases, the product model logic will cause the coverage to be added automatically; if not, the policy will fail to validate until the user has manually added the coverage. In either case, there will be an additional change to the policy revision that was present in neither of the sets of changes that contributed to the merge process.

Once the differences $\Delta_1$ 605 have been merged forward to D2 502 and D3 503, the differences between each pair of subsequent revisions is then determined. This step is denoted by circled number 4 604 in FIG. 6, with the differences represented by $\Delta_2$ 606 and $\Delta_3$ 607. If there are no merge conflicts, then $\Delta_2$ 606 will equal the change between A 405 and B 406, or $\Delta_B$ 608, and $\Delta_3$ 607 will equal the change between B 406 and C 407, or $\Delta_C$ 609. However, if there are merge conflicts and if those conflicts were resolved by merging the latest changes forward, these equalities will not hold. In that case, the value will not have changed, but a special difference must be included to indicate that there was a merge conflict, as well as what the future-dated value was that was overwritten. The differences $\Delta_2$ 606 and $\Delta_3$ 607 can then be displayed along with $\Delta_1$ 605 so that a user can view the differences applied by the OOSE.

Figure 2:
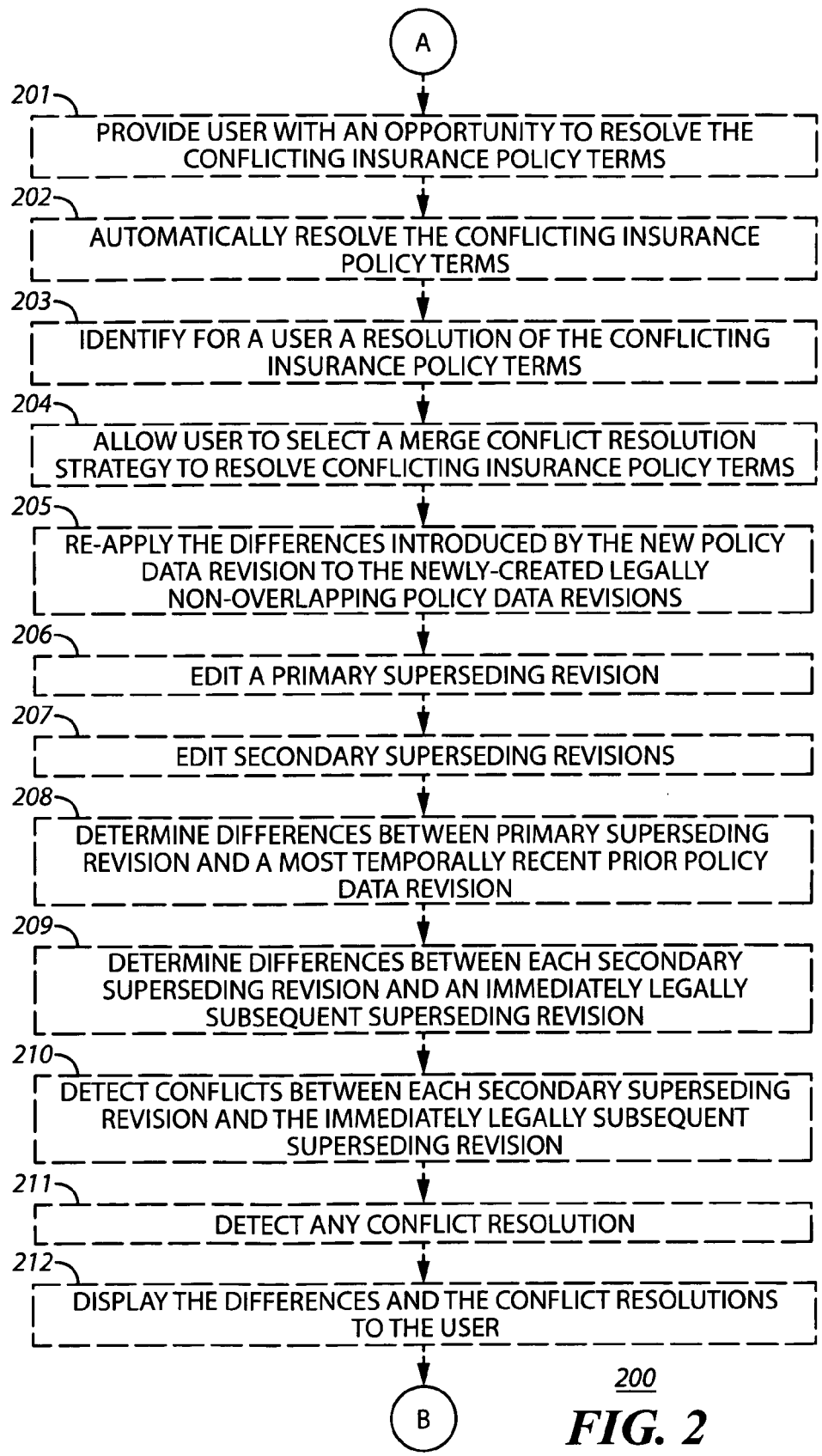
FIG. 2 comprises a flow diagram as configured in accordance with various embodiments of the invention.

Referring again to FIG. 1, if conflicting insurance policy terms exist, the conflicting terms may then be identified 109 for a user. Further, and referring now to FIG. 2, if a merge conflict is created by applying the differences introduced by the new policy data revision into the newly-created legally non-overlapping policy data revisions, a user may be provided 201 with an opportunity to resolve the conflicting insurance policy terms. For example, and referring now to FIG. 7, a screen shot 700 is displayed allowing a user to select the merge rules 701 that should be applied for an OOSE. In this example, the display asks the user "How should merge conflicts be resolved?" 702. The user may elect to resolve the merge conflict by having the change introduced by the OOSE overwrite any future version 703, or the user may select to retain the terms specified by the future (legally subsequent) version 704. The user may then select to "Recalculate merge" 705 once making the merge rule selection. If the user has chosen to overwrite any future version 703, the merge conflict is resolved by setting the value on the superseding revision to the value from $\Delta_1$. If the user has instead chosen to retain the terms specify by the future version 704, the value on the superseding revision is left unchanged. (It should be noted and understood at the outset that these screen shots are illustrative embodiments of the methods used for policy revisioning. As such, it will be clearly understood that the options, functions, arrangements, and displays of these teachings are not limited to those specifically shown in these embodiments.)

By another optional approach, and referring again to FIG. 2, the conflicting insurance policy terms may be automatically resolved 202. Automatically resolving the conflicting insurance policy terms may optionally comprise accepting the terms introduced by the new policy data revision. Therefore, the default resolution of any conflict would be to accept the most temporally recent change as introduced by the new policy data revision. Referring again to the revisions displayed in FIG. 6, for example, any conflicting terms detected by the merge of $\Delta_1$ into D2 and D3 (step 3 603) would be resolved in favor of the terms introduced by revision D 408. Conversely, the automatic resolution of the conflicting insurance policy terms may comprise accepting the terms defined by the revision that is legally subsequent to the new policy data revisions. Therefore, in FIG. 6, any conflicting terms detected by the merge of $\Delta_1$ into D2 and D3 (step 3 603) would be resolved in favor of the terms introduced by the legally subsequent revisions B 406 and C 407, respectively.

As another option, the conflicting insurance policy terms may be automatically resolved according to a configurable method. The configurable method may include a series of parameters and/or default or predefined rules that will govern the resolution of merge conflicts. The configurable method may vary according to the needs, requirements, and desires of a given system administrator and/or user base. As an example, the configuration may require that any conflicts relating to limits or deductibles be resolved by accepting the higher limit or deductible amount.

Referring again to FIG. 2, upon resolution of the merge conflicts, the changes and conflict resolutions may be identified 203 for the user. Optionally, alternative resolutions for the conflicts may be presented. Referring now to FIG. 8, an illustrative screen shot 800 displays for a user a list of changes for a given insurance policy. For example, the first set of changes 801 relate to a vehicle change for a 1997 Toyota Corolla, with the relevant changes listed below. The changes resulting from the OOSE revision are listed in bold and the effective date of each change is listed in brackets. The OOSE revision 802 effective Jan. 7, 2006 changed the license plate from 1GLC254 to 2QWS945. Listed below this change is the merge conflict 803 produced by the introduction of the OOSE revision into the legally subsequent revisions. The legally subsequent revision changed the license plate to 2QWS945. As stated, the merge conflict 803 was resolved by having the OOSE revision overwrite the legally subsequent (but temporally preceding) revision. An alternate merge conflict resolution 804 is listed below the implemented resolution, specifying the resolution that would have been produced had the legally subsequent revision determined the result. The alternate merge conflict resolution 804 would have retained the legally subsequent revision of changing the license plate to 2QWS944.

Referring again to FIG. 2, the user may be allowed 204 to select a merge conflict resolution strategy to resolve the conflicting insurance policy terms. The differences introduced by the new policy data revision may then be reapplied 205 (i.e., re-merged) to the newly-created legally non-overlapping policy data revisions according to the selected merge conflict resolution strategy, to create new merged legally non-overlapping policy data revisions. The re-merge will first delete any existing merged legally non-overlapping policy data revisions and recreate the initial newly-created legally non-overlapping policy data revision. The system will then perform the re-merge based on the user's selected conflict resolution strategy to produce a new set of merged legally non-overlapping policy data revisions.

Figures 9, 10:
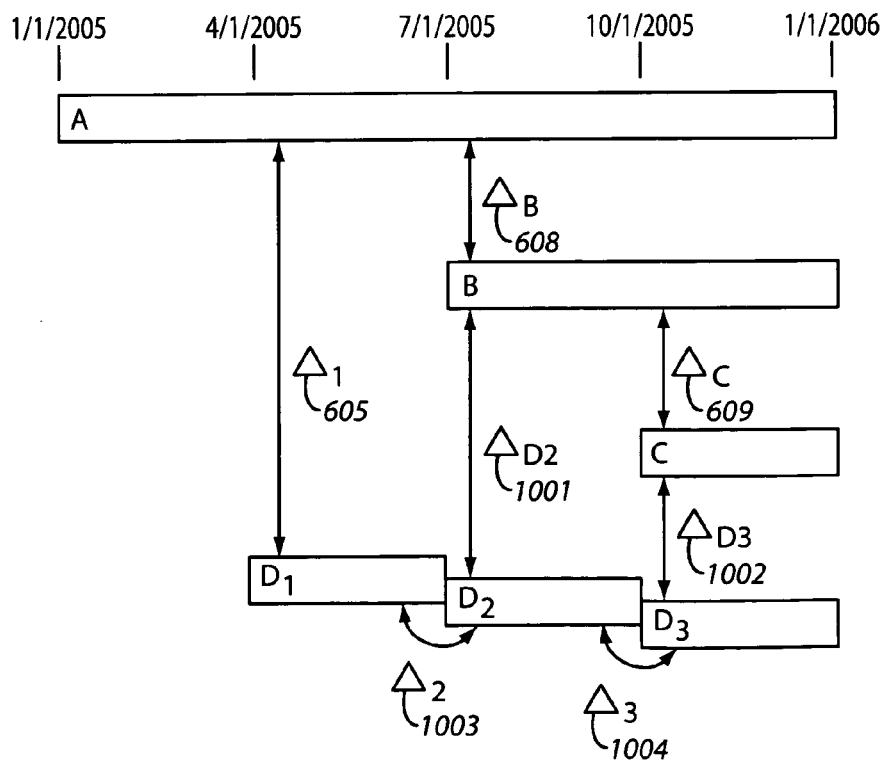
FIG. 9 comprises an illustrative screen shot as configured in accordance with various embodiments of the invention.
FIG. 10 comprises an illustrative schematic as configured in accordance with various embodiments of the invention.

A user may also be able to view the non-overlapping revisions created as a result of merging the new changes forward. Further, the user may be provided with an opportunity to edit 206 a primary revision, wherein the primary revision comprises the merged legally non-overlapping policy data revision having an earliest legally effective date. In the above example, the primary revision is the post-merge version of D1. In addition, the user may be provided with an opportunity to edit 207 the secondary superseding revisions, wherein the secondary superseding revisions comprise the merged legally non-overlapping policy data revisions subsequent to the primary revision. In the above example, the superseding revisions are the post-merge versions of D2 and D3. As shown in FIG. 9, an illustrative screen shot 900 displays a list of effective dates 901, as provided in a dropdown list. Selecting from this list allows a user to switch between revisions and allows the user to view the selected revision.

After editing the primary revision D1 and/or one or more of the secondary superseding revisions D2, D3, etc., the net set of differences and conflict resolutions can be recollected for display to the user for review before the policy can be quoted. This process is similar to the process of collecting the differences after the merge, except that arbitrary changes may have been made to any of the superseding revisions, including additions or removals of policy elements, or changes to policy data fields.

To collect the complete set of differences for display to the user, the pair-wise differences must be determined between each superseding revision and the immediately subsequent superseding revision in legally effective time. Therefore, referring again to FIG. 2, differences are determined 208 between the primary superseding revision and a most temporally recent prior policy data revision, and between 209 each secondary superseding revision and an immediately legally subsequent superseding revision. In considering each pair-wise difference, any field-level conflicts between 210 each secondary superseding revision and the immediately legally subsequent superseding revision may then be detected. In addition, any resolutions to the identified conflicts may also be detected 211. Finally, the pair-wise differences and the conflict resolutions are collected together for display 212 to the user.

To collect the complete differences between superseding revisions, the differences between each of the new revisions (except the last superseding revision) and the bound revision on which it is based are computed. Referring now to FIG. 10, an illustrative schematic of an insurance policy is shown post-merge. The differences between each of the new revisions (except the last superseding revision) and the bound revision on which it is based are shown as $\Delta_1$ 605 and $\Delta_{D2}$ 1001. Then, the differences between each superseding revision and an immediately legally subsequent superseding revision are determined, which are shown as $\Delta_2$ 1003 and $\Delta_3$ 1004 in FIG. 10. Finally, the differences shown as $\Delta_B$ 608 and $\Delta_C$ 609 in FIG. 10 must be computed, as described above.

The differences between D1 and D2 to be displayed to the user are roughly equal to the differences $\Delta_2$ 1003. However, in the event of merge conflicts, the differences to display to the user may be slightly different from $\Delta_2$ 1003. The differences between D1 and D2 may be computed as a function of three sets of differences: $\Delta_2$ 1003 (the literal difference between revision D1 and revision D2), $\Delta_1$ 605 (the difference between revision A and revision D1), and $\Delta_B$ 608 (the difference between revision A and revision B). For additions and removals, the RIID of the added or removed element can be used as a "key"; additions or removals for elements with different RIIDs may be processed independently. For any given RIID, additions or removals in $\Delta_2$ 1003 can be included in the set of differences to display between D1 and D2. In addition, the RIID of any removed element discovered in $\Delta_2$ 1003 must be remembered, since the outright removal of an element trumps a modification to one of that element's fields. Hence, field changes to removed elements must be ignored when processing field changes. The subsequent paragraph assumes that any field change encountered for any removed element discovered in $\Delta_2$ 1003 is disregarded.

Field changes are handled differently from additions and removals. In the case of a field change, both the RIID of the modified entity and the name of the changed field together serve as a key to identify each change; two field changes with different keys are completely unrelated. To determine which field changes to include in the displayed set of differences, the lookup table 1100 shown in FIG. 11 is used. As shown in the "Case" column 1101 of the table, there are 11 total cases to consider. These 11 cases have been classified into 6 coarse-grained groups (0-5) according to the values on the revisions A, B, and D1. For any given (RIID, field) pair, the difference sets $\Delta_B$ 1102, $\Delta_1$ 1103, and $\Delta_2$ 1104 are consulted, and their values compared to the corresponding columns of the lookup table 1100. One of the 11 cases must match, and the "Add Diffs" column 1105 shown in the table 1100 is used to determine what change to add to the set of differences displayed to the user.

In FIG. 11, the cases labeled 5A 1106 and 5B 1107 correspond to field-level merge conflicts resolved according to two different conflict resolution strategies. The cases labeled 1 1108, 2B 1109, 3B 1110, 4B 1111, and 5C 1112 occur only because the user has made a manual edit to the superseding revision after the merge. These cases can be identified and displayed specially to the user on the review page, as indicated by the "Conflict Resolution" column 1113.

Figure 3:
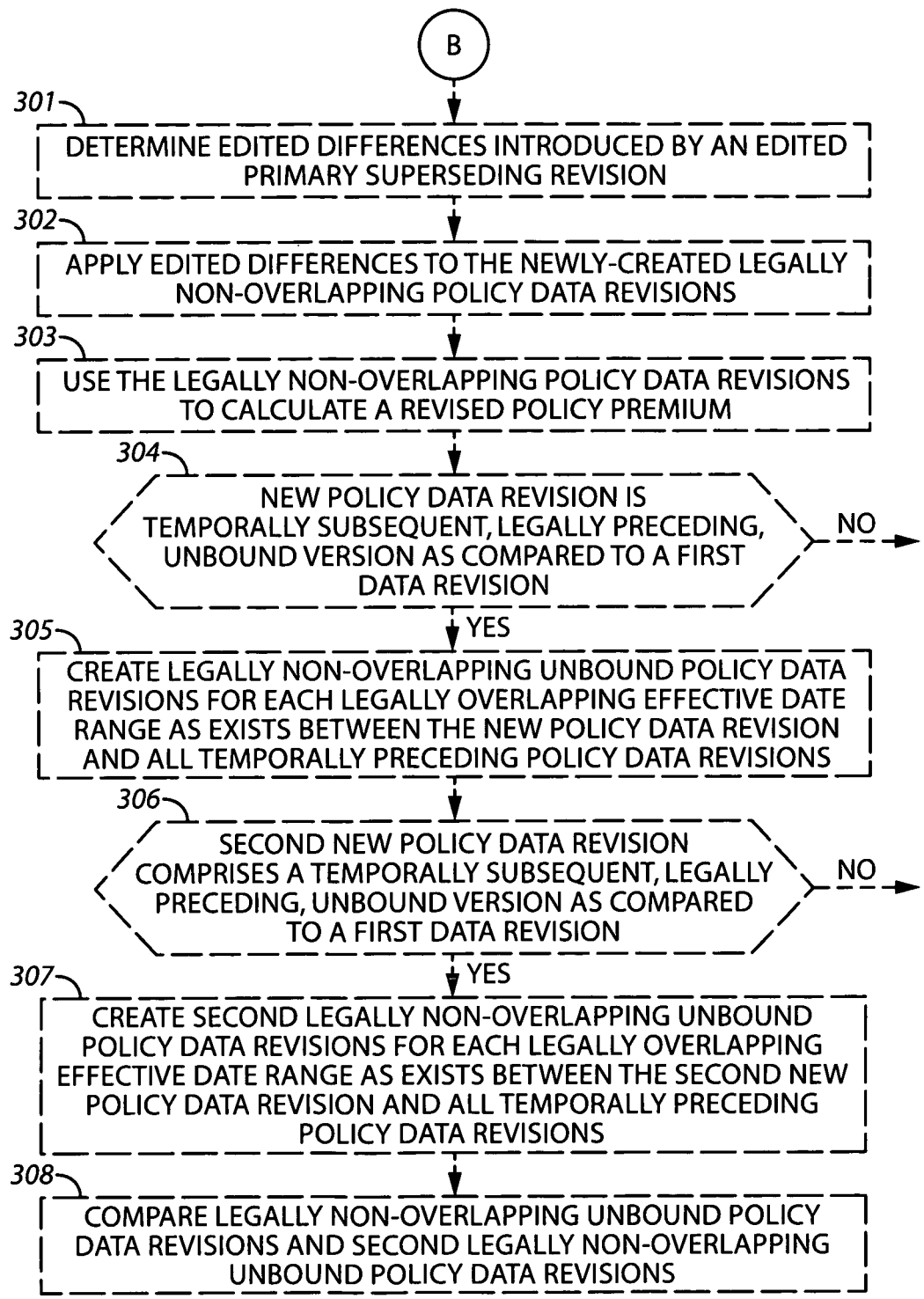
FIG. 3 comprises a flow diagram as configured in accordance with various embodiments of the invention FIG. 4 comprises an illustrative schematic as configured in accordance with various embodiments of the invention.

By another optional approach, after the primary revision is edited, the user can then re-merge the changes introduced by the edits forward to the superseding revisions. The re-merge will first involve deleting any existing merged legally non-overlapping policy data revisions and recreating the initial newly-created legally non-overlapping policy data revisions. To perform the re-merge, and referring now to FIG. 3, any edited differences introduced by the edited primary superseding revision are first determined 301. This step involves determining the differences between the edited primary revision and the base revision, thereby determining a new $\Delta_1$. Then, the edited differences are applied 302 to the initial newly-created legally non-overlapping policy data revisions to create new merged legally non-overlapping policy data revisions. Therefore, the differences of the new $\Delta_1$ are applied to the initial legally non-overlapping policy data revisions. The re-merge occurs in the same manner as described above for the initial merge. After the re-merge, the policy may then be re-quoted. It should also be noted that if a user had made edits to any of the superseding secondary revisions after the initial merge, those edits will be lost if the user elects to re-merge.

As discussed above, each policy data revision may have a corresponding change date (y-axis 404 in FIG. 4) and a corresponding legally effective date (x-axis 403 in FIG. 4) stored therewith. The change dates and the legally effective dates can then be used to facilitate determination of a present liability. In addition, the policy data revisions may be queried in terms of a change date to determine a status of the insurance policy as of a queried for change date. Likewise, the policy data revisions may be queried in terms of a legally effective date to determine a status of the insurance policy as of a queried-for legally effective date. As a result, for example, a user could enter a particular change date or legally effective date and the status of the insurance policy for the entered date would then be displayed. Querying in terms of the change date allows a user to ask what versions existed when looking at the history of the policy from some earlier date. Therefore, a carrier can determine what an insurance policy looked like on an effective date X based on the history at an earlier date Y. Typically, a user would use today's date as the change date, however it may be necessary to determine how a policy looked at some time in the past (such as, for example, legal reasons or audits). Therefore, the policy will be queried using a past change date. In a common case, the insurer will want to know what the policy looked like as of the date that a claim was reported, in order to detect possible fraud where a damaged item is added retroactively to the policy after the damage has actually occurred.

The ability to query in terms of the legally effective date and the change date allows a carrier to reproduce what an insurance policy looked like as of a particular legally effective date and as if looking at the history from some earlier change date. For example, and referring now to FIG. 5, each policy data revision has a corresponding change date (y-axis 404) and effective date (x-axis 403). If a user asks what version of the policy is effective on Oct. 2, 2005, the user is typically assuming a change date of today and the system should show the user revision D3 503. Therefore, "today" would be the default change date. However, a user may need to determine what policy was in effect at a time earlier than today. For example, if the user asked about the policy effective Oct. 2, 2005 based on a change date of Sep. 15, 2005, the system should show revision C 407. Likewise, if the user asked about the policy effective Oct. 2, 2005 based on a change date of Jul. 1, 2005, the system should show revision B 406.

Figures 12, 13:
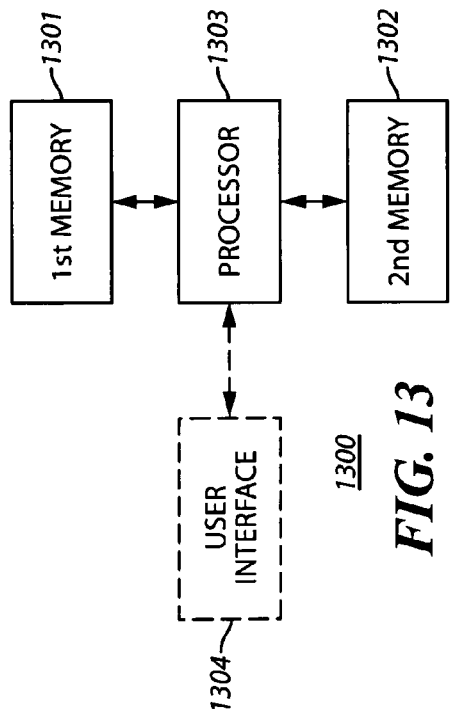
FIG. 12 comprises an illustrative screen shot as configured in accordance with various embodiments of the invention.
FIG. 13 comprises a block diagram as configured in accordance with various embodiments of the invention.

Upon resolution of the merge conflicts, and referring again to FIG. 3, the legally non-overlapping policy data revisions may then be used 303 to calculate a revised policy premium. Once any conflicts are resolved, the effect of the new OOSE revision and the resulting creation of the legally non-overlapping policy data revisions can be displayed to a user and used to calculate a revised policy premium. Referring now to FIG. 12, an illustrative screen shot 1200 shows a list of recent policy transactions. The top portion 1201 of the screen shot display 1200 lists the completed policy transactions, while the bottom portion 1202 displays revisions that are currently in process and have not yet become bound. The first list is sorted by "Effective Date" 1203, with the link associated for each listed date taking the user to the policy file as of that date (current behavior). The linked effective dates, such as the date of "Jan. 10, 2006" in the first row 1204, are those that are underlined. It should be noted that the effective date of "Jan. 10, 2006" in the second row 1205 is not linked because it has been completely replaced by the revision above it that has the same effective date but a later issue date. The final column 1206 lists the "Net Premium" and is intended to show the total transaction amount associated with the quote for that revision. For an OOSE resulting in multiple revision segments (such as the revisions in the first row 1204 and the third row 1207 based on the same work order), each revision has a quote listed in the premium column. Therefore, a user can view the revised policy premium based on each revision.

A new OOSE policy data revision may also comprise an unbound draft revision that is not yet an implemented revision. Referring again to FIG. 3, when a new policy data revision is 304 a temporally subsequent unbound version as compared to a first policy data revision and also comprises a legally effective date range preceding at least in part an effective date range of the first policy data revision, legally non-overlapping unbound policy data revisions may then be created 305 for each legally overlapping effective date range as exists between the new policy data revision and all temporally preceding policy data revisions. A draft revision will not affect any other policy calculations until it becomes bound. The above-described merging forward process can be performed on the legally non-overlapping unbound policy data revisions so that a user may then evaluate the potential effects of this new revision on the policy should it become bound. If the unbound revision is then implemented, the legally non-overlapping unbound policy data revisions will become bound as of a particular change date and effective date.

Further, a second unbound OOSE draft revision may be proposed having alternative policy terms. When a second new policy data revision is 306 a temporally subsequent unbound version as compared to a first policy data revision and also comprises a legally effective date range preceding at least in part an effective date range of the first policy data revision, second legally non-overlapping unbound policy data revisions may then be created 307 for each legally overlapping effective date range as exists between the second new policy data revision and all temporally preceding policy data revisions. Again, the above-described merging forward process can be performed on the second legally non-overlapping unbound policy data revisions so that a user may then evaluate the potential effects of this second new revision on the policy should it become bound.

The legally non-overlapping unbound policy data revisions corresponding to the new policy data revision may then be compared 308 to the second legally non-overlapping unbound policy data revisions corresponding to the second new policy data revisions. This comparison can allow a user to determine the potential results produced by each unbound revision and evaluate options based on those potential results. A user may then select the appropriate unbound revision, if any, for implementation so that it becomes a bound revision, while the unimplemented revision may be discarded.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 13, an illustrative approach to such a platform will now be provided. FIG. 13 generally depicts pertinent portions of an apparatus 1300 for facilitating policy revisioning. This apparatus 1300 includes generally a first memory 1301, a second memory 1302, a processor 1303, and, optionally, a user interface 1304.

The first computer memory 1301 has stored therein data that defines an insurance policy as a plurality of discrete temporally-sequential policy data revisions, wherein each revision incorporates information from temporally prior revisions covering an effective date range of the revision. The second computer memory 1302 has stored therein a program that executes when a given one of the policy data revisions is temporally subsequent as compared to a first policy data revision and also comprises a legally effective date range preceding at least in part an effective date range of the first policy data revision, and creates legally non-overlapping policy data revisions for each legally overlapping effective date range as exists between the new policy data revisions and all temporally preceding policy data revisions. Each newly-created legally non-overlapping policy data revision comprises changes introduced by the new policy data revision and at least one temporally preceding policy data revision. The processor 1303 controls execution of the programmed instructions.

A user interface 1304 may be operably coupled to the processor to thereby facilitate obtaining instructions from a user. A variety of user interfaces are available and well-known in the art and may include, for example, a user display and a user input such as a keyboard and cursor control interface of choice.

The program stored in the second computer memory 1302 may then determine the differences introduced by the new policy data revision and automatically apply the differences to the newly-created legally non-overlapping policy data revisions. In automatically applying the differences, the program may also determine if the application of the differences introduced by the new policy data revision to the newly-created legally non-overlapping policy data revisions creates conflicting insurance policy terms. The program may then automatically resolve any conflicting insurance policy terms. Further, the program stored in the second computer memory 1302 may then use the legally non-overlapping policy data revisions to calculate a revised policy premium.

Each policy data revision stored in the first computer memory 1301 may have a corresponding change date and a corresponding legally effective date. Likewise, the newly-created legally non-overlapping policy data revisions created by the program stored in the second computer memory 1302 may have a corresponding change date and a corresponding legally effective date that is also stored in the second computer memory 1302. The program may then use the change dates and the legally effective dates to facilitate determination of a present liability.

Those skilled in the art will recognize and understand that such an apparatus 1300 may be comprised of a plurality of physically distinct elements as is suggested by the illustration shown in FIG. 13. It is also possible, however, to view this illustration as comprising a logical view, in which case one or more of these elements can be enabled and realized via a shared platform. It will also be understood that such a shared platform may comprise a wholly or at least partially programmable platform as are known in the art.

The teachings, as set forth above, provide an advantageous approach to handling of an out of sequence revision by dividing an insurance policy period into time intervals and corresponding revision segments. In addition, information regarding the effective date and the actual change date will be retained despite the introduction of an out of sequence revision. As a result, insurance providers may accurately process claims and also monitor fraud activities and preserve information for auditing purposes or other legal reasons. Thus, the described embodiments provide for an effective and efficient approach for handling insurance policy revisions.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
a processor;
a first computer memory having stored therein data that defines an insurance policy as a plurality of discrete temporally-sequential policy data revisions, wherein each revision incorporates information from temporally prior revisions covering an effective date range of the revision;
a second computer memory having stored therein a program which when executed causes the processor to:
receive a new policy revision that is temporally subsequent as compared to a first policy data revision and that comprises a legally effective date range preceding at least in part an effective date range of the first policy data revision;
divide the new policy revision into a plurality of legally non-overlapping policy data revision segments, wherein at least one of the legally non-overlapping unbound policy data revision segments has a legally effective date range that starts on an effective date of the new policy revision and ends on an initial effective date of the first policy data revision;

determine, based at least in part on the legally non-overlapping unbound policy data revisions, effects of the new policy data revision.

2. The apparatus of claim 1 wherein the program is further configured to:
automatically apply the differences introduced by the new policy data revision to the newly-created legally non-overlapping policy data revisions to create merged legally non-overlapping policy data revisions;
provide a user with an opportunity to edit at least one of:
a primary superseding revision, wherein the primary superseding revision comprises the merged legally non-overlapping policy data revision having an earliest legally effective date;
secondary superseding revisions, wherein the secondary superseding revisions comprise the merged legally non-overlapping policy data revisions subsequent to the primary revision.

3. The apparatus of claim 2 wherein the program is further configured to:
determine edited differences introduced by an edited primary superseding revision;
apply the edited differences to the newly-created legally non-overlapping policy data revisions to create new merged legally non-overlapping policy data revisions.

4. The apparatus of claim 2 wherein the program is further configured to:
determine differences between the primary superseding revision and a most temporally recent prior policy data revision; and
determine differences between each secondary superseding revision and an immediately legally subsequent superseding revision.

5. The apparatus of claim 4 wherein the program is further configured to:
detect any conflicts between each secondary superseding revision and the immediately legally subsequent superseding revision; and
detect any conflict resolutions.

6. The apparatus of claim 5 wherein the program is further configured to:
display the differences and the conflict resolutions to the user.

7. The apparatus of claim 1 wherein the program further causes the processor to:
receive a second new policy data revision that is a temporally subsequent unbound version as compared to a first policy data revision and also comprises a legally effective date range preceding at least in part an effective date range of the first policy data revision;
create second legally non-overlapping unbound policy data revisions for each legally overlapping effective date range as exists between the second new policy data revision and all temporally preceding policy data revisions.

8. The apparatus of claim 7 wherein the program is further configured to:
compare the legally non-overlapping unbound policy data revisions corresponding to the new policy data revision and the second legally non-overlapping unbound policy data revisions corresponding to the second new policy data revision.

9. The apparatus of claim 7, wherein the program further causes the processor to:
determine effects of the second new policy revision should it become bound, the determination being made without requiring the second new policy data revision to be bound;
present to the user a comparison of the effects of the first new policy data revision and the effects of the second new policy data revision; and
receive a user selection of one of the first policy data revision and the second new policy data revision; and
bind the user selection.

10. The apparatus of claim 1 wherein the program determines differences introduced by the new policy data revision and automatically applies the differences to the newly-created legally non-overlapping policy data revisions.

11. The apparatus of claim 10 wherein automatically applying the differences introduced by the new policy data revision further comprises determining if applying the differences introduced by the new policy data revision to the newly-created legally non-overlapping policy data revisions creates conflicting insurance policy terms.

12. The apparatus of claim 11 wherein the program identifies for a user the conflicting insurance policy term.

13. The apparatus of claim 12 wherein the program provides the user with an opportunity to resolve the conflicting insurance policy term.

14. The apparatus of claim 11 wherein the program is further configured to:
allow a user to select a merge conflict resolution strategy to resolve the conflicting insurance policy terms; and
re-apply the differences introduced by the new policy data revision to the newly-created legally non-overlapping policy data revisions and resolve the conflicting insurance policy terms according to the selected merge conflict resolution strategy to create new merged legally non-overlapping policy data revisions.

15. The apparatus of claim 11 wherein the program automatically resolves the conflicting insurance policy terms.

16. The apparatus of claim 15 wherein the program automatically resolves the conflicting insurance policy terms by accepting terms introduced by the new policy data revision.

17. The apparatus of claim 15 wherein the program automatically resolves the conflicting insurance policy terms by resolving the conflicting insurance policy terms according to a configurable method.

18. The apparatus of claim 1 wherein the program uses the legally non-overlapping policy data revisions to calculate a revised policy premium.

19. The apparatus of claim 1 wherein each policy data revision has a corresponding change date and a corresponding legally effective date also stored in the first computer memory.

20. The apparatus of claim 19 wherein the program uses the change dates and the legally effective dates to facilitate determination of a present liability.

21. The apparatus of claim 1 wherein other policy calculations are affected by the new policy revision only when the new policy revision becomes bound.

* * * * *